Feb. 18, 1958
A. C. ROSS
2,824,298
VEHICLE SPEED INDICATING DEVICE
Filed Dec. 5, 1956
2 Sheets-Sheet 1
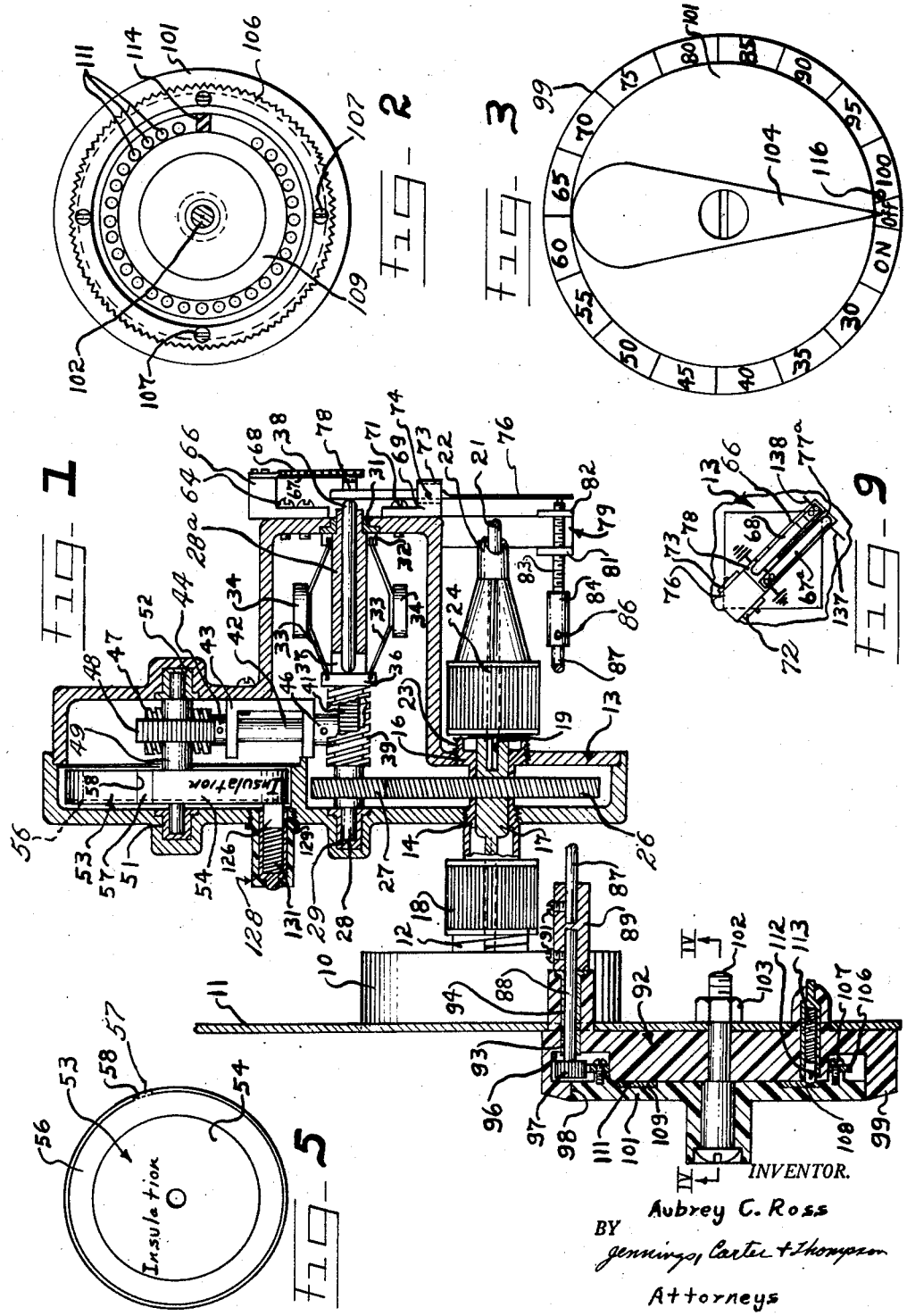
INVENTOR.
Aubrey C. Ross
BY
Jennings, Carter + Thompson
Attorneys

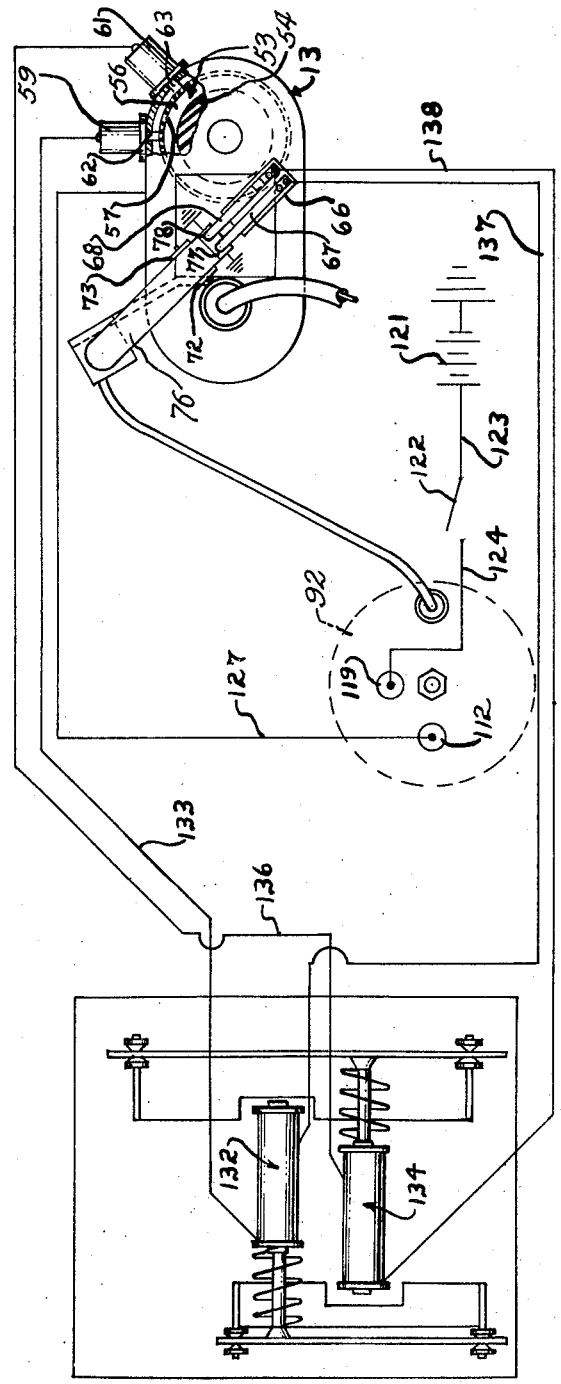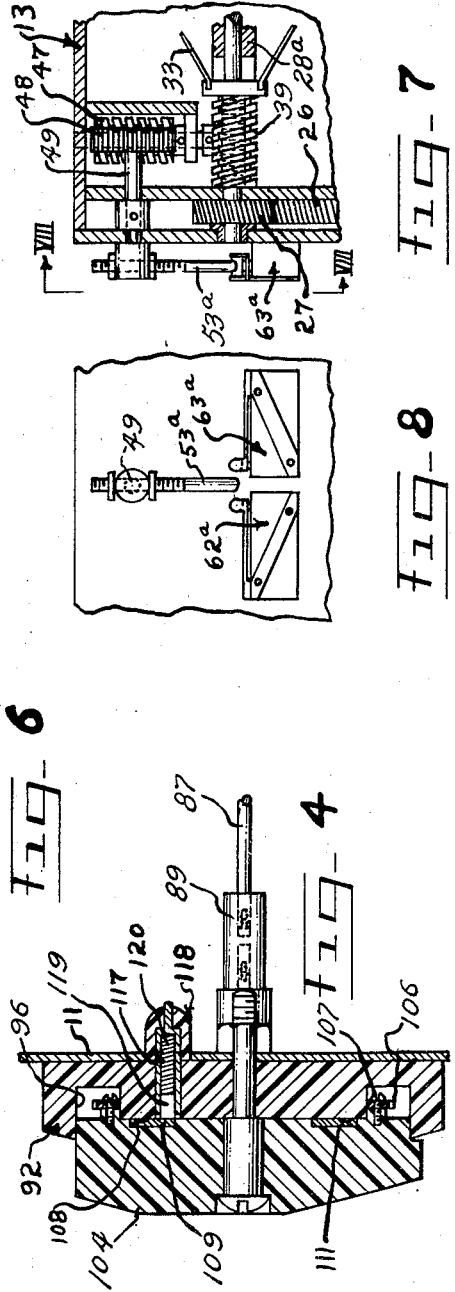

United States Patent Office 2,824,298
Patented Feb. 18, 1958

2,824,298

VEHICLE SPEED INDICATING DEVICE

Aubrey C. Ross, Birmingham, Ala.

Application December 5, 1956, Serial No. 626,524

14 Claims. (Cl. 340—264)

This invention relates to a vehicle speed indicating device and has for an object the provision of a safety device which indicates to the driver whether or not the vehicle is moving within a predetermined speed range and yet permits full time use of the driver's eyes on the road.

Another object of my invention is to provide a vehicle speed indicating device of the character designated which is especially adapted for night driving whereby all inside lights may be extinguished, thus increasing visibility, reducing eye strain and fatigue and eliminating the necessity of the driver having to peer at a dimly lit speedometer.

Another object of my invention is to provide a vehicle speed indicating device which calls the driver's attention to fluctuations in speed, thus eliminating the danger of the driver becoming velocitized.

Another object of my invention is to provide a vehicle speed indicating device which indicates to the driver by an audible signal when the vehicle is driving above a predetermined minimum speed and when the vehicle is driving above a predetermined maximum speed.

Another object of my invention is to provide a vehicle speed indicating device of the character designated in which the audible signals is in the form of chimes having tones which are pleasing to the ear, thus preventing the signal from being confused with road noises such as, horns, bells, sirens, and the like.

A further object of my invention is to provide a vehicle speed indicating device which embodies an audible signal indicating the distance traveled by the vehicle, thus permitting the driver to follow a road map or oral instructions to a particular location.

A further object of my invention is to provide a vehicle speed indicating device of the character designated which shall be simple of construction, economical of manufacture, reliable in operation, and adapted for quick adjustment for any desired speed while driving.

Apparatus embodying features of my invention is illustrated in the accompanying drawings, forming a part of this application, in which:

Fig. 1 is a sectional plan view;

Fig. 2 is a side elevational view showing a portion of the mechanism for adjusting the device for use at various speeds and for use in turning the device on and off;

Fig. 3 is a front elevational view of the dial and pointer employed to indicate the predetermined speed which is selected;

Fig. 4 is a sectional view taken generally along the line IV—IV of Fig. 1;

Fig. 5 is a side elevation of the timing wheel;

Fig. 6 is a diagrammatic view showing the electrical circuit for the device;

Fig. 7 is a fragmental sectional view showing a modification;

Fig. 8 is a side elevational view taken generally along the line VIII—VIII of Fig. 7; and Fig. 9 is a fragmental view showing another modification of my invention.

Referring now to the drawings for a better understanding of my invention, I show a speedometer indicated generally at 10 which is attached to the instrument panel 11 of a vehicle in the usual manner. Also, projecting forwardly of the speedometer 10 is an externally threaded connector 12 which is usually employed to attach the speedometer cable.

Mounted forwardly of the instrument panel 11 is a housing 13 having sleeve-like bearing members 14 and 16 mounted therein for supporting a short shaft 17. The rear portion of the shaft 17 is reduced in diameter and is operatively connected to the speedometer 10 by a suitable connector 18 which is in threaded engagement with the connector 12. The forward end of the shaft 17 is provided with a suitable socket 19 for receiving the speedometer cable 21. The speedometer cable housing indicated at 22 is connected to an externally threaded portion 23 of the bearing member 16 by means of a connector 24.

Mounted nonrotatably on the shaft 17 within the housing 13 is a gear wheel 26 which meshes with a smaller gear wheel 27 fixedly mounted on a shaft 28 having a tubular section 28a. As shown in Fig. 1, the ends of the shaft 28 are mounted for rotation in suitable bearings 29 and 31. Mounted nonrotatably on the shaft 28 adjacent the bearing 31 is a collar 32 which is held against axial movement relative to the shaft 28. Secured to the collar 32 are the ends of spring members 33 which carry governor weights 34. The other ends of the spring members 33 are attached to a transverse member 36. An axially extending slot 37 is provided in the tubular section 28a for receiving the transverse member 36 whereby the transverse member is adapted for axial movement relative to the shaft 28 as the governor weights 34 move outwardly by centrifugal force in a manner well understood. Mounted for sliding movement within the tubular section 28a is a rod-like actuating member 38 for a purpose to be described hereinafter.

Mounted nonrotatably on the shaft 28 adjacent the gear 27 is a worm gear 39 which meshes with a gear 41 fixedly mounted on a shaft 42. A suitable bearing bracket 43 supports the shaft 42 for rotation, as shown. Collars 44 and 46 are mounted on the shaft 42 adjacent the bearing bracket 43 to limit axial movement of the shaft 42 relative to the bearing bracket. Mounted nonrotatably on the shaft 42 is a worm gear 47 which meshes with a gear 48. The gear 48 is mounted nonrotatably on a shaft 49 which is supported for rotation in suitable bearings 51 and 52.

Mounted nonrotatably on the shaft 49 is a timing wheel 53 which rotates one revolution for a predetermined distance of travel of the vehicle. For example, if it is desired to indicate the speed at which the vehicle is traveling at intervals of ¼ mile, the ratio of the gears between the timing wheel 53 and the speedometer cable 21 are such that the timing wheel 53 rotates one revolution each time the speedometer cable 21 rotates a number of revolutions equivalent to a distance of one-quarter mile. The main body portion of the timing wheel 53 is formed of a non-conductive material 54. An annular strip of conductive material 56 is embedded in the side of the timing wheel, as shown in Fig. 5. Formed integrally with the annular strip 56 is a tab 57 which is bent across the periphery of the wheel 53, as shown in Fig. 1. A transverse gap 58 is provided in the outer surface of the conductive material 54 for receiving the tab 57.

Mounted on the housing 13, as shown in Fig. 6, are angularly spaced brush units 59 and 61 having carbon brushes 62 and 63, respectively, which are adapted to ride upon the periphery of the timing wheel 53. It will thus be seen that for each revolution of the timing wheel 53, the carbon brushes 62 and 63 contact the transverse tab 57 which lies within the gap 58.

Mounted on the housing 13 adjacent the forward end of the centrifugal governor unit by means of screws 64 is a bracket 66 which is formed of a suitable non-conductive material. Mounted on the bracket 66 are flexible contact arms 67 and 68. As shown in Fig. 1, the free end of the arm 68 is positioned outwardly of the free end of the arm 67 whereby the actuating rod-like member 38 is nearer the arm 67. The contact arms 67 and 68 are formed of a flexible material, such as spring bronze, and the arm 68 is preferably formed of a stiffer material than is the arm 67. Mounted on the housing 13 on the opposite side of the actuating rod-like member 38 from the bracket 66 is a supporting bracket 69. The bracket 69 is secured to the housing 13 by any suitable means such as by screws 71. The bracket 69 has outwardly extending legs 72 and 73, as shown in Figs. 1 and 6. Mounted for pivotal movement between the legs 72 and 73 on a transverse pin 74 is a flexible arm 76. As shown in Fig. 1, one end of the arm 76 extends across the forward end of the actuating rod-like member 38 and has mounted thereon a pair of contact points 77 and 78. If desired, the contact points 77 and 78 may be formed integrally of a suitable material. As shown in Fig. 6, the contact point 77 is opposite the contact arm 67 while the contact point 78 is opposite the contact arm 68.

To vary the position of the contact points 77 and 78 and the amount of force required to move the contact points into engagement with their respective contact arms 67 and 68, the end of the arm 76 opposite the contact points is urged outwardly by adjustable means now to be described. Mounted on the housing 13 is a laterally extending bracket 79 having upstanding legs 81 and 82. Suitable threaded openings are provided in the legs 81 and 82 for receiving a threaded member 83 which is adapted to engage the adjacent end of the arm 76, as shown. Secured to the threaded member 83 by means of a sleeve 84 and a set screw 86 is one end of a flexible cable 87. The other end of the cable 87 is connected to a short shaft member 88 by means of a sleeve 89 and set screws 91.

Mounted on the instrument panel 11 is a base member 92 which is preferably formed of a non-conductive material. A suitable opening 93 is provided in the base member 92 for receiving a bearing sleeve member 94 for the shaft 88, as shown. Also, an annular portion of the base member 92 adjacent the end of the shaft 88 is cut away as at 96 to permit free rotation of a gear wheel 97 which is secured to the end of the shaft 88. The central portion of the base member 92 is cut away as at 98 to form an outer annular member 99. Suitable indicia, such as miles per hour are placed on the annular member 99, as shown in Fig. 3. Mounted for rotation in the cut-away portion 98 is a disc member 101 which is rotatably connected to the base mmeber 92 by means of a bolt 102 having a nut 103. A suitable pointer 104 is provided on the disc member 101 to indicate the miles per hour selected.

Mounted on the disc 101 in position to ride in the annular recess 96 is an annular gear wheel 106 which meshes with the gear 97 whereby the flexible shaft 87 and the threaded portion 83 are rotated in response to rotation of the disc 101, thus urging the adjacent end of the flexible arm 76 outwardly or inwardly, as the case may be. The annular gear wheel 106 is secured to the disc 101 by any suitable means, such as by screws 107.

As shown in Figs. 1 and 4, an annular recess 108 is provided in the disc member 101 for receiving an annular member 109. A plurality of recesses or depressions 111 are provided in the annular member 109 for receiving the inner end of a bronze brush 112 which is urged inwardly by means of a compression spring 113. The annular member 109 is provided with a non-conductive area 114 in position to contact the bronze brush 112 when the pointer 104 is moved to the off position. The weight carrying arms 33 of the centrifugal governor are of a U-shape before installation whereby sufficient force is exerted against the actuating rod-like member 38 to force the contact 77 into engagement with the contact arm 67 when there is no force exerted by the threaded member 83 against the arms 76. Preferably, there are no recesses 111 on the annular member 109 below the point corresponding to 30 miles per hour and there is no force applied by the threaded member 83 until the pointer 104 reaches 30 miles per hour. Accordingly, even though the governor unit is turning too slow to produce a centrifugal force sufficient to move the rod-like member 38 outwardly, the contact 77 is in engagement with the contact arm 67 while the pointer 104 is positioned in the "on" position and below the 30 miles per hour reading. A suitable stop 116 is provided on the base member 92 to limit rotation of the pointer 104 to a single revolution in either direction.

A through opening 117 is provided in the base member 92 opposite the annular member 109 for receiving a brush assembly 118 having a carbon brush 119 which is urged into engagement with the inner surface of the annular member 109 by a compression spring 120. The brush 119 is connected to the vehicle battery 121 by a line 123, the ignition switch 122 and line 124.

The bronze brush 112 is connected to a carbon brush 126 by means of a line 127. The carbon brush 126 is mounted in a suitable brush housing 128 which is in threaded engagement with a suitable opening 129 provided in the housing 13. The carbon brush 126 is in position to bear against the annular strip of conductive material 56 on the timing wheel 53 whereby current is supplied from the brush 112 to the conductive strip 56. A compression spring 131 urges the carbon brush 126 into engagement with the annular conductive strip 56.

The carbon brush 62 is connected to a solenoid actuated chime indicated generally at 132 by means of a line 133. The carbon brush 63 is connected to a solenoid actuated chime indicated generally at 134 by means of a line 136. The solenoid actuated chime 132 is connected to the contact arm 67 by means of a line 137. In like manner, the solenoid actuated chime 134 is connected to the contact arm 68 by means of a line 138. The contacts 77 and 78 are grounded whereby the lines 137 and 138 are grounded when the contact arms 67 and 68 are in contact with their contacts 77 and 78, respectively.

From the foregoing description, the operation of my improved vehicle speed indicating device will be readily understood. As the speedometer cable 21 turns, the timing wheel 53 is turned one revolution for a predetermined distance of travel, such as one revolution of the timing wheel for one-quarter mile of travel of the vehicle. Each time the timing wheel 53 makes a complete revolution, the carbon brushes 62 and 63 engage the tab 57 on the timing wheel. With the speedometer 10 registering an even mile, the carbon brush 62 is positioned in contact with the tab 57 whereby the contact will be repeated at each one-quarter mile interval thereafter. Also, the carbon brush 63 being positioned an angular distance in a clockwise direction from the carbon brush 62, the contact of the brush 62 with the tab 57 is followed immediately by contact of the tab 57 with the brush 63.

If it is desired to travel a short distance to a certain location, such as when following road map directions or oral instructions as to the distance to the location, the pointer 104 is moved to the "on" position, as shown in Fig. 3. With the pointer in this position, there is no force exerted against the arm 76 by the threaded member 83. Accordingly, due to the pressure applied by the U-shaped spring members 33, the contact 77 is in contact with the arm 67 although the governor unit is rotating below the speed at which centrifugal force urges the rod-like member 38 outwardly. With the contact 77 in engagement with the contact arm 67, current passes from the battery 121 through line 123, switch 122, line 124, to the carbon brush 119 which is in engagement with the annular contact member 109. The current passes from the contact member 109 through the bronze brush 112, line 127 to the carbon brush 126 which is in contact with the conductive strip 56. Accordingly, each time the carbon brush 62 comes into engagement with the tab 57 the circuit is completed through the line 133, solenoid actuated chime 132, line 137 to the contact arm 67 which is in engagement with the contact 77, thus grounding the circuit and completing the circuit to the battery 121. As the speedometer cable 121 rotates the timing wheel 53 makes a complete revolution for each quarter mile travel, thereby causing the solenoid actuated chime 132 to be actuated each time the vehicle travels a distance of one quarter of a mile.

When it is desired to travel at a predetermined speed, such as 60 miles per hour, the pointer 104 is rotated in a clockwise direction to the 60 mile per hour position on the annular member 99. As the pointer is rotated, the disc 101 and the annular gear 106 are rotated thus causing the gear 97, shaft 88, flexible shaft 87 and the threaded member 83 to move in a direction to exert force against the adjacent end of the arm 76. As the disc 101 is rotated, the bronze brush 112 moves from one depression 111 to another until the pointer reaches the 60 mile per hour position, thus completing the circuit through the annular conductive member 109 to the carbon brush 126 which engages the timing wheel 53. It will be understood, that the linkage between the annular gear 106 and the arm 76 is such that when the pointer 104 is positioned at selected miles per hour positions on the annular member 99, the required amount of force is imparted to the adjacent end of the arm 76 to cause contact between the contact 77 and the contact arm 67 when the selected speed, determined by the position of the pointer 104, is approached. That is, when the pointer 104 is set at 60 miles per hour, the centrifugal force exerted by the weights 34 cause the rod-like member 38 to overcome the force exerted by the threaded member 83 when the vehicle approaches 60 miles per hour, such as 57½ miles per hour, thus completing the circuit through the contact 77 and the contact arm 67.

Due to the fact that the position of the contact arm 63 be positioned further from the contacts 77 and 78 than is the contact arm 67, the governor unit must rotate at a higher speed to move the contact 78 into engagement with the contact arm 68. In actual practice, I adjust the position of the contact arm 68 relative to its contact 78 whereby these contacts are closed when a speed is reached of approximately 5 miles per hour greater than the speed at which the contact 77 engages the contact arm 67. Accordingly, when the pointer 104 is set at a 60 mile per hour speed and the speed is increased to 62½ miles per hour, the rod-like actuating member 38 urges the contact 78 into engagement with the contact arm 68, thereby completing the circuit to the solenoid actuated chime 134 each time the carbon brush 63 moves into engagement with the tab 57 of the conductive strip 56. As long as the vehicle is traveling at a speed greater than 62½ miles per hour, the engagement of the carbon brush 62 with the tab 57 is followed immediately by engagement of the carbon brush 63 with the tab 57. Accordingly, with the pointer set at 60 miles per hour and the vehicle traveling at a speed greater than 62½ miles per hour, the actuation of the solenoid actuated chime 132 is followed immediately by actuation of the solenoid actuated chime 134. This action is repeated each quarter mile of travel until the speed falls below 62½ miles per hour. Preferably, the chime element 134 is of a higher pitch than the chime element 132 whereby the sounds may be easily distinguished from each other. Should the speed of the vehicle decrease to approximately 57½ miles per hour, with the pointer 104 set at 60 miles per hour, the contact 77 moves out of engagement with the contact arm 67, thereby breaking the circuit to the solenoid actuated chime 132. Accordingly, the chimes are both silent when the vehicle is traveling at a speed approximately 2½ miles per hour less than the speed selected by pointer 104.

From the foregoing, it will be seen that each time the pointer 104 is positioned at the "on" position, shown in Fig. 3, no tension is applied to the arm 76, thus permitting the contact 77 to contact the arm 67 in the manner described heretofore. On the other hand, when the pointer 104 is positioned on a selected speed, which preferably is above 30 miles per hour, the threaded member 83 does exert a force against the adjacent end of the arm 76, thus separating the contact 77 from the contact arm 67. The contacts thus remain separated until the predetermined speed set by the pointer 104 is approached. With any selected speed, the solenoid actuated chime 132 is actuated when the selected speed is approached. Upon reaching a speed of approximately 2½ miles per hour greater than the selected speed, the actuation of the solenoid actuated valve 132 is followed immediately by the actuation of the solenoid actuated valve 134 in the manner described heretofore. Also, as described heretofore should the speed of the vehicle drop below 2½ miles per hour less than the selected speed, both solenoid actuated chimes are silent.

In Figs. 7 and 8 of the drawings I show a slightly modified form of construction in which the shaft 49 extends outwardly of the housing 13. Mounted on the shaft 49 outwardly of the housing 13 is an actuating arm 53a which is adapted to engage suitable switches 62a and 63a whereby the circuit is completed to the solenoid actuated chimes 132 and 134, respectively, each time the shaft 49 makes a complete revolution. With the remainder of the apparatus identical with that described in Figs. 1 through 6, it will be seen that the switch 62a and 63a are actuated at intervals equivalent to one-quarter mile of travel of the vehicle and they perform the same function as the carbon brushes 62 and 63 to complete the circuit to the solenoid actuated chimes 132 and 134. Preferably, the switch elements 62a and 63a are of the usual microswitch type.

Referring now to Fig. 9 of the drawings, I show a further modified form of my invention in which the solenoid actuated chime 132 is actuated at predetermined distances of travel by the vehicle until the speed selected by the pointer 104 is approached. The solenoid actuated chime 132 is then silent until the speed drops below the selected speed. As shown in Fig. 9 the arm 76 is provided with the contact 78 which is adapted to engage the contact arm 68 in the manner described heretofore. Secured to the arm 76 adjacent the contact 78 is one end of a contact arm 67a. The other or free end of the contact arm 67a is adapted to engage a contact 77a mounted on the bracket 66. The contact arm 67a is grounded whereby the electrical circuit is completed through contact 77a and line 137 to the solenoid actuated chime 132 when there is no force exerted against the arm 76 by the rod-like actuating member 38. Accordingly, when a selected speed is set by the pointer 104, the contact 77a remains in contact with the contact arm 67a until the force exerted by the rod-like member 38 overcomes the force exerted by the threaded member 83.

It will thus be seen that engagement of the rod-like member 38 with the arm 76, when the selected speed is approached, moves the contact arm 67a out of engagement with the contact 77a whereby the solenoid actuated chime 132 is silent until the speed drops below the selected speed. The contact 78 is moved into engagement with the contact arm 68 when the speed reaches the predetermined higher speed as described heretofore.

The operation of the apparatus shown in Fig. 9 is similar to that of the apparatus shown in Figs. 1 through 8. Instead of the contact 77a being moved into engagement with the contact arm 67a when the selected speed is approached, the rod-like actuating member 38 moves the contact arm 67a out of engagement with the contact 77a. Accordingly, when the vehicle is moving at approximately the selected speed the chimes are both silent. For example, if the pointer 104 is set at 60 miles per hour and the speed drops to 57½ miles per hour, the contact arm 67a would move back into engagement with the contact 77a, thus causing the solenoid actuated chime 132 to be actuated when the speed is below 57½ miles per hour. On the other hand, should the speed exceed 62½ miles per hour, with the pointer 104 at 60 miles per hour, the contact point 78 would move into contact with contact arm 68, thus actuating the solenoid actuated chime 134. It will thus be seen that with the pointer 104 at 60 miles per hour, the chimes are both silent only when the speed ranges from approximately 57½ miles per hour to 62½ miles per hour.

From the foregoing, it will be seen that I have devised improved apparatus for indicating, by audible means, the speed of a vehicle whereby the driver may select a predetermined speed and then be warned when he has reached the desired speed, when he has exceeded the desired speed by a predetermined amount and when the speed of the vehicle drops below a predetermined speed. By providing solenoid actuated chimes, the driver does not have to look at visual signals to determine the speed at which he is driving. Also, the chime tones are pleasing to the ear and are not confused with other noises, such as horns, sirens and the like and can be heard above the vehicle radio when played at normal volume. Also, the chime tones do not lull the driver to sleep if the gap between the speeds at which the solenoid actuated chimes are actuated is maintained at approximately 5 miles per hour. In fact, it has the opposite effect by calling the driver's attention to excess speed or the fact that the speed has dropped to a predetermined speed below the desired speed. A drowsy driver cannot maintain speed within this gap. Furthermore, the device completely eliminates the necessity of providing inside dashboard lights while driving at night, thus reducing the glare to a minimum and increasing visibility.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. A vehicle speed indicating device comprising a centrifugal governor, means rotating said governor in response to the speed of the vehicle, a first pair of electrical contacts operatively connected to said governor whereby they are closed when the governor rotates above a predetermined speed, a second pair of electrical contacts operatively connected to said governor whereby they are closed when the governor rotates at a higher predetermined speed than the speed at which said first pair of contacts are initially closed, signal means in circuit with said first pair of contacts, other signal means in circuit with said second pair of contacts, and means supplying current to the circuits connecting said first and second pairs of contacts to their respective signal means at predetermined distances of travel of said vehicle whereby each signal means in circuit with a pair of closed contacts is actuated at predetermined distances of travel of the vehicle.

2. A vehicle speed indicating device comprising a centrifugal governor, means rotating said governor in response to the speed of the vehicle, a first pair of electrical contacts operatively connected to said governor whereby they are closed when the governor rotates above a predetermined speed, a second pair of electrical contacts operatively connected to said governor whereby they are closed when the governor rotates at a higher predetermined speed than the speed at which said first pair of contacts are initially closed, adjustable means associated with said pairs of contacts for varying the predetermined speeds at which the pairs of contacts are initially closed, signal means in circuit with said first pair of contacts, other signal means in circuit with said second pair of contacts, and means supplying current to the circuits connecting said first and second pairs of contacts to their respective signal means at predetermined distances of travel of said vehicle whereby each signal means in circuit with a pair of closed contacts is actuated at predetermined distances of travel of the vehicle.

3. A vehicle speed indicating device comprising a centrifugal governor, means rotating said governor in response to the speed of the vehicle, an actuating member operatively connected to said governor whereby it moves outward in response to an increase in speed of rotation of said governor, a first pair of electrical contacts in position to be closed by said actuating member when the governor rotates above a predetermined speed, a second pair of electrical contacts in position to be closed by said actuating member when the governor rotates at a higher predetermined speed than the speed at which said first pair of contacts are initially closed, adjustable means urging the contacts of said pairs of contacts away from each other whereby the predetermined speeds at which the pairs of contacts are initially closed may be adjusted, signal means in circuit with said first pair of contacts, other signal means in circuit with said second pair of contacts, and means supplying current to the circuits connecting said first and second pairs of contacts to their respective signal means at predetermined distances of travel of said vehicle whereby each signal means in circuit with a pair of closed contacts is actuated at predetermined distances of travel of the vehicle.

4. A vehicle speed indicating device as defined in claim 3 in which the signal means in circuit with the first and second pairs of contacts are in the form of audible signals.

5. A vehicle speed indicating device as defined in claim 3 in which the first and second pairs of contacts are in circuit with solenoid actuated chimes.

6. A vehicle speed indicating device comprising a tubular shaft, means rotating said shaft in response to the speed of the vehicle, weight carrying arms mounted adjacent one of their ends in fixed axial relationship to said tubular shaft, a transverse member connecting the other ends of said weight carrying arms and adapted for axial movement relative to said tubular shaft, there being an axially extending through opening in said tubular shaft for slidably receiving said transverse member, a rod-like member within said tubular shaft with one end thereof bearing against said transverse member whereby upon inward movement of the transverse member in response to an increase in the speed of rotation of the shaft the other end of the rod-like member moves outwardly of the opposite end of the tubular shaft, a first pair of electrical contacts mounted in position to be closed by the outward movement of the rod-like member when the tubular shaft rotates above a predetermined speed, a second pair of electrical contacts mounted in position to be closed by the outward movement of the rod-like member when the tubular shaft rotates at a higher predetermined speed than the speed at which said first pair of contacts are initially closed, signal means in circuit with said first pair of contacts, other signal means in circuit with said second pair of contacts, and means supplying current to the circuits connecting said first and second pairs of contacts to their respective signal means at predetermined distances of travel of said vehicle whereby each signal means in circuit with a pair of closed contacts is actuated at predetermined distances of travel of the vehicle.

7. A vehicle speed indicating device comprising a centrifugal governor, means rotating said governor in response to the speed of the vehicle, an arm pivotally supported adjacent said governor, at least one electrical contact mounted adjacent one end of said arm, a second electrical contact opposite said first mentioned contact, a third electrical contact opposite said first mentioned contact and positioned a greater distance therefrom than said second contact, adjustable means urging said first mentioned contact away from said second and third contacts, an actuating member operatively connected to said governor and adapted to urge said first mentioned contact into engagement with said second contact when the governor rotates above a predetermined speed and to urge said first mentioned contact into electrical connection with said third contact when the governor rotates at a higher predetermined speed than the speed at which said first mentioned contact initially engages said second contact, a first signal in circuit with said first mentioned contact and said second contact a second signal in circuit with said first mentioned contact and said third contact, and means supplying current to the circuits which are connected to the signals at predetermined distances of travel of the vehicle.

8. A vehicle speed indicating device as defined in claim 7 in which the arm carrying the first mentioned contact is in the form of a flexible member pivotally supported intermediate its ends and the adjustable means urging the first mentioned contact away from the second and third contacts comprises an externally threaded actuating member adapted to engage an internally threaded support and bear against the end of said flexible member opposite the end thereof carrying said first mentioned contact.

9. A device as defined in claim 8 in which the threaded actuating member is connected to a control member by a flexible cable.

10. A vehicle speed indicating device comprising a centrifugal governor, means rotating said governor in response to the speed of the vehicle, a first pair of electrical contacts operatively connected to said governor whereby they are closed when the governor rotates above a predetermined speed, a second pair of electrical contacts operatively connected to said governor whereby they are closed when the governor rotates at a higher predetermined speed than the speed at which said first pair of contacts are initially closed, signal means in circuit with said first pair of contacts, other signal means in circuit with said second pair of contacts, a rotary member, means rotating said rotary member in response to the distance traveled by said vehicle, electrical switches energized by said rotary member at predetermined distances of travel of said vehicle and in circuit with the circuits connecting said first and second pairs of contacts to their respective signal means whereby each signal means in circuit with a pair of closed contacts is actuated at predetermined distances of travel of the vehicle.

11. A vehicle speed indicating device as defined in claim 10 in which the rotary member is a disc-like member having an electrical contact thereon disposed to engage stationary angularly spaced contacts, said electrical contact on the disc-like member and said angularly spaced contacts forming said electrical switches which are energized by said rotary member.

12. A vehicle speed indicating device as defined in claim 10 in which the rotary member is in the form of an arm and said electrical switches are normally open and are positioned to be actuated by said arm.

13. A vehicle speed indicating device comprising a centrifugal governor, means rotating said governor in response to the speed of the vehicle, a first pair of electrical contacts operatively connected to said governor whereby they are actuated when the governor rotates above a predetermined speed, a second pair of electrical contacts operatively connected to said governor whereby they are actuated when the governor rotates at a higher predetermined speed than the speed at which said first pair of contacts are initially actuated, signal means in circuit with said first pair of contacts, other signal means in circuit with said second pair of contacts, and means supplying current to the circuits connecting said first and second pairs of contacts to their respective signal means at predetermined distances of travel of said vehicle whereby each signal means in circuit with a pair of closed contacts is actuated at predetermined distance of travel of the vehicle.

14. A vehicle speed indicating device comprising a centrifugal governor, means rotating said governor in response to the speed of the vehicle, a first pair of normally closed electrical contacts operatively connected to said governor whereby they are opened when the governor rotates above a predetermined speed, a second pair of electrical contacts operatively connected to said governor whereby they are closed when the governor rotates at a higher predetermined speed than the speed at which said first pair of contacts are initially opened, signal means in circuit with said first pair of contacts, other signal means in circuit with said second pair of contacts, and means supplying current to the circuits connecting said first and second pairs of contacts to their respective signal means at predetermined distances of travel of said vehicle whereby each signal means in circuit with a pair of closed contacts is actuated at predetermined distances of travel of the vehicle.

References Cited in the file of this patent

UNITED STATES PATENTS 1,547,909     Earle _____ July 28, 1925